(12) United States Patent
Xie

(10) Patent No.: US 7,244,925 B2
(45) Date of Patent: Jul. 17, 2007

(54) COMPACT AND LOW PROFILE OPTICAL NAVIGATION DEVICE

(75) Inventor: Tong Xie, San Jose, CA (US)

(73) Assignee: Avago Technologies ECBU IP (Singapore) Pte. Ltd, Singapore (SG)

( * ) Notice: Subject to any disclaimer, the term of this patent is extended or adjusted under 35 U.S.C. 154(b) by 198 days.

(21) Appl. No.: 11/085,282

(22) Filed: Mar. 21, 2005

(65) Prior Publication Data

US 2006/0208170 A1    Sep. 21, 2006

(51) Int. Cl.
*H01J 40/14*    (2006.01)
(52) U.S. Cl. .................... 250/221; 345/156; 345/175
(58) Field of Classification Search ............. 250/221, 250/222.1; 345/156–167, 173, 175
See application file for complete search history.

(56) References Cited

U.S. PATENT DOCUMENTS

| | | | |
|---|---|---|---|
| 5,907,152 A * | 5/1999 | Dandliker et al. | 250/221 |
| 2002/0104957 A1 | 8/2002 | Liess et al. | |
| 2002/0167489 A1 | 11/2002 | Davis | |
| 2005/0275618 A1 | 12/2005 | Juh et al. | |

FOREIGN PATENT DOCUMENTS

| | | |
|---|---|---|
| EP | 0081348 A3 | 6/1983 |
| EP | 1073005 A1 | 1/2001 |
| EP | 1241616 A3 | 9/2002 |
| EP | 1429235 A1 | 6/2004 |

OTHER PUBLICATIONS

Search Report under Section 17(5), Search Report From GP Patent Office, Jul. 3, 2006, 4 pgs.

* cited by examiner

*Primary Examiner*—John R. Lee

(57) ABSTRACT

An optical navigation device detects relative motion of non-optically flat surfaces, e.g. fingers by comparing the captured images of the surface texture, e.g. ridges on the finger. Within a housing, a light source and a sensor array are positioned proximately. The sensor array is mounted on a substrate. A lens array interposes the surface to be imaged and the sensor array such that a 1:1 image of the surface, e.g. finger surface of the user onto the 2D sensor array, is formed. The micro-lenses may be designed to match individual pixels on the sensor array, or each element of the lens array is used to cover a group of pixels on the sensor. The micro-lenses may be positioned such that the image is formed onto the sensor array or formed in a plane in space such that the image is defocused from the surface.

23 Claims, 2 Drawing Sheets

COMPACT AND LOW PROFILE OPTICAL NAVIGATION DEVICE

BACKGROUND

With the ever-increasing popularity of mobile and portable electronic devices, demands for small and low cost pointing device have increased dramatically. Optical navigation technologies used inside optical mice offer many advantages over other solutions in accuracy, reliability and flexibility. However existing mouse sensors modules are too big to be applied to portable electronic devices such as cellphones and personal digital assistants (PDAs).

Optical mouse sensors detect relative motion by tracking the changes in the captured images from the reflection off the navigation surface. The navigation images may be patterns of shadows and highlights on the surface cast by an obliquely illuminated light emitting diode (LED), or diffraction patterns or speckles formed by the navigation surface with a coherent illumination source. The heart of an optical mouse is the navigation module that consists of a light source, an image sensor and an optical piece (may or may not contain a optical piece), e.g. an imaging lens. The light source, e.g. a LED or a laser, is used to provide illumination of the navigation surface; while the imaging portion of the optical piece forms navigation images onto the image sensor array. An imaging lens typically is used to image the navigation images onto a 2D sensor array. The size of a typical mouse sensor module is quite large, especially the height. The large module size has not been an issue for the proliferation of the optical navigation technologies in applications such as desktop computer mice. It however prevents the broader applications of the same technology in portable electronic devices such as cellphones and PDAs. For portable electronics, a pointing device with a thickness that is on the order of 2 mm is desired, while a typical mouse sensor module requires more than 10 mm of space between the navigation surface and the sensor.

Existing optical mouse sensors are too big to be integrated into portable electronic devices such as cellphones, primarily due the height of the device assembly. A typical optical mouse sensor requires more than 14 mm spacing between the navigation surface and the image sensor in order to satisfy the imaging conditions required for navigation. According to the current module design, the imaging function is typically performed by a single lens element. The minimum spacing between the surface and the sensor is limited by the sensor pixel size and the array size, optical efficiency (or f/#) and the desired optical magnification.

The height of the traditional mouse sensor module is primarily limited by the height requirement of the image optics. Typically a single plastic molded lens is used with a unit magnification, and a 2D sensor with 20×20 pixels at 50 um pitch is used. In first order, in order to achieve 1:1 imaging, the spacing between the navigation surface and the sensor will be 4× the focal length of the image lens. As the spacing between the navigation surface and the sensor get reduced, the focal length of the imaging lens must be reduced. It is theoretically possible to design a very short focal length lens for this purpose therefore achieving a near 2 mm spacing between the sensor and the navigation surface, although in practice the aperture size of the lens must be considered in order to maintain reasonable light collection efficiency. The ratio of the lens focal length and the diameter of the lens is the f-number of the lens. It is practically difficult to have a single element refractive lens to have an f/# that is smaller than 1 that can cover a large field of view with good image quality. For this reason, a typical optical mouse sensor module requires a more than 10 mm spacing between the sensor and the navigation surface.

SUMMARY

An optical navigation device detects relative motion of non-optically flat surfaces, e.g. fingers by comparing the captured images of the surface texture, e.g. ridges on the finger. Within a housing, a light source and a sensor array are positioned proximately. The sensor array is mounted on a substrate. A lens array interposes the surface to be imaged and the sensor array such that a 1:1 image of the surface, e.g. finger surface of the user onto the two-dimensional (2D) sensor array, is formed. The micro-lenses may be designed to match individual pixels on the sensor array, or each element of the lens array is used to cover a group of pixels on the sensor. The micro-lenses may be positioned such that the image is formed onto the sensor array or formed in a plane in space such that the image is defocused from the surface.

DETAILED DESCRIPTION

Figure 1:
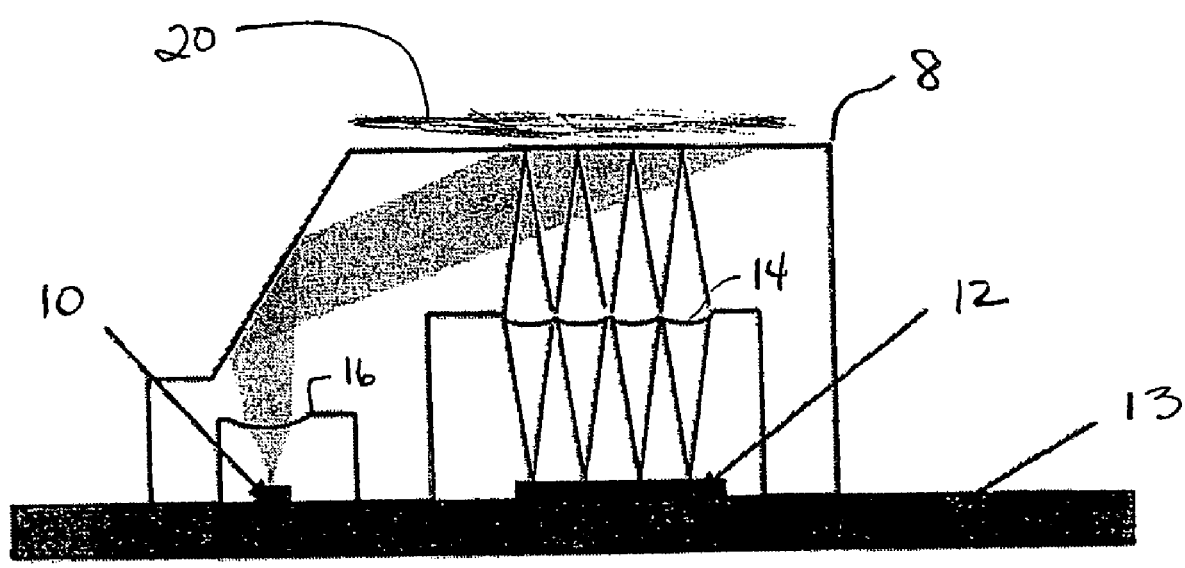
FIG. 1 illustrates an embodiment of the present invention.
Figure 2A:
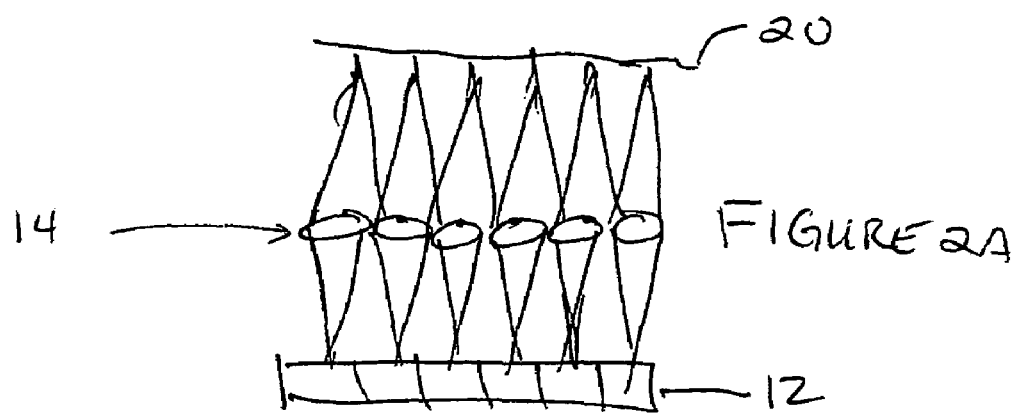
FIGS. 2A-C illustrate embodiments of the present invention.
Figure 2B:
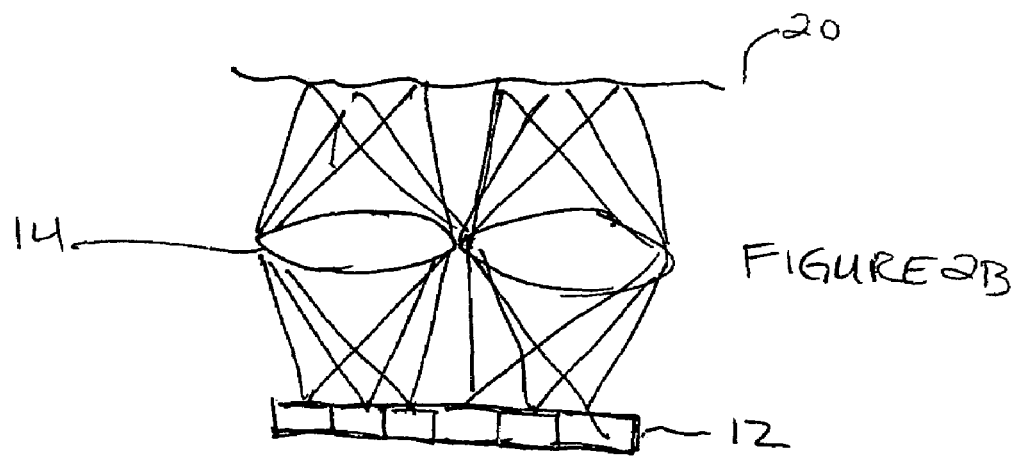
Figure 2C:
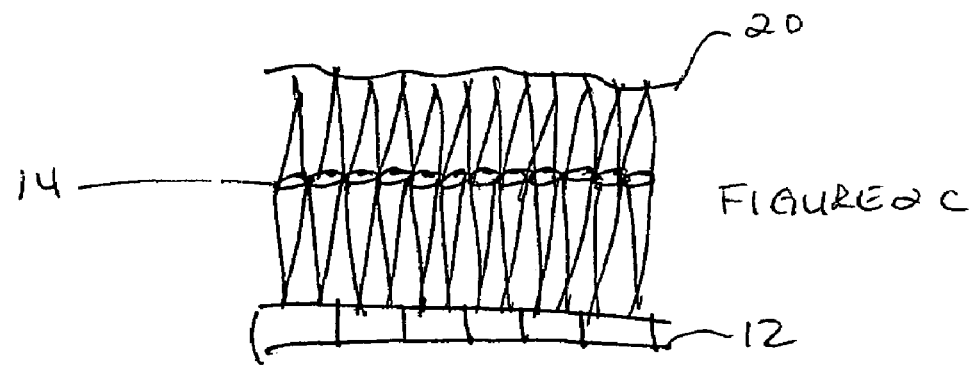

As shown in FIG. 1, in one embodiment of the present invention, a lens array is used in place of the single imaging lens in a traditional optical navigation device. Within a housing 8, a light source 10 and a sensor array 12 are positioned proximately. The sensor array 12 is mounted on a substrate 13, e.g. a printed circuit board (PCB). A lens array 14 is positioned such that the light emitted from the light source 10 is reflected off a surface 20. The lens array 14 includes M×N elements, where M>1 and N≧1. The lens array 14 collects the reflected light off the surface 20, and forms a pattern onto the 2D sensor array 12 underneath. For example, when a LED is used as the light source 10, the lens array 14 may be used to form an image of the surface, e.g. finger surface of the user. As shown in FIGS. 2A-C, each element of the lens array 14 may be designed to match individual pixels on the sensor array (FIG. 2A), or each element of the lens array is used to cover a group of pixels on the sensor (FIG. 2B), or each element of the lens array is used to cover a fraction of one pixel area on the sensor (FIG. 2C). The lens array 14 may be positioned such that the image of the surface 20 is formed onto the sensor array, or a plane in space that is different from the surface 20 is formed onto the sensor array.

An optional lens 16 may be placed between the light source 10 and the surface 20 where the output beam is substantially collimated. Light is referred to illustratively. The inventive concept may be extended to include electromagnetic radiation over a wavelength range extending from about 1 nanometer (nm) to about 1 meter (m).

The overall height of the device is significantly reduced because the focal length of each element of the lens array 14 can be very short while still maintaining the same f/# of a single lens element.

The illumination source 10 may be a coherent light source such as a laser diode or a vertical cavity surface emitting laser. Alternatively, it may be an incoherent or quasi-coherent light source such as a light emitting diode (LED) or a broadband source with or without an optical filter. Although this embodiment discloses the light source 10 as being contained within the housing 8, the surface may be illuminated by an external light source e.g. the ambient light. The surface itself may be self-illuminated as in the case when the surface includes luminescent material, e.g. electroluminescent.

The lens array 14 is comprised of elements that may be refractive, diffractive or hybrid.

The sensor array 12 may be a charge coupled device (CCD) or a complementary metal oxide semiconductor (CMOS) imaging array. The sensor array 12 is preferably positioned to capture the pattern formed by the lens array. The pattern may directly correspond to the surface, or be a derivative of surface information, e.g. speckles or interference patterns produced from the reflected light off the surface.

The invention significantly reduces the spacing required between the surface and the sensor array using a different optical design concept therefore reduced the overall height of the navigation module.

As illustrated in FIG. 1, by using a multiple element lens array, the surface to sensor array distance can be dramatically reduced while maintaining the same optical properties, e.g. magnification and f/#, of a single lens implementation using the same sensor array.

Light collection efficiency of the imaging lens can be design to be equal or better than in the case of a single element lens. The macro-lens array may be designed such that each element corresponds to one pixel of the sensor array, or each element maps images to a group of pixels in the sensor, or each pixel in the sensor corresponds to a group of lens elements.

Manufacturing of macro-lens arrays can be achieved in many ways such as etching, reflow, replication or molding. According to one embodiment of the present invention, the lens array is integrated to the sensor array at wafer level. In another embodiment, the lens array is a separate piece that is placed in between the surface and the sensor.

The invention claimed is:

1. An apparatus comprising:
    a housing;
    an M×N array of elements for collecting electromagnetic waves from a surface, where M>1 and N≧1; and
    a motion detection circuit, having a sensor array for receiving the electromagnetic waves, determining relative motion in the directions along the first and second axes;
    wherein the M×N array is positioned to form an image of a plane in space that is different from the surface onto the sensor array.

2. An apparatus as defined in claim 1 wherein the electromagnetic waves are selected from a group that include visible light, infrared light, and microwaves.

3. An apparatus, as defined in claim 2, furthering comprising a light source, positioned within the housing, operable to emit the electromagnetic wave towards the surface.

4. An apparatus, as defined in claim 3, each element of the M×N array corresponds to at least a fraction a sensor in the sensor array.

5. An apparatus, as defined in claim 3, each element of the M×N array corresponds to a single sensor in the sensor array.

6. An apparatus, as defined in claim 3, each element of the M×N array corresponds to a group of sensors in the sensor array.

7. An apparatus, as defined in claim 3, wherein the light source emits visible or infrared light.

8. An apparatus, as defined in claim 7, wherein each element of the M×N array is a lens.

9. An apparatus, as defined in claim 8, the lens is a refractive, diffractive or hybrid element.

10. An apparatus, as defined in claim 3, wherein the light source is one of a coherent, quasi-coherent, and non-coherent light source.

11. An apparatus, as defined in claim 10, wherein the light source is a coherent light source, the coherent light source selected from a group consisting of laser diodes and vertical cavity surface emitting lasers.

12. An apparatus, as defined in claim 3, wherein the light source is a non-coherent or quasi-coherent light source, the light source selected from a group consisting of light emitting diodes (LED) and broadband light sources.

13. An apparatus, as defined in claim 3, wherein the sensor array is one of a CCD and a CMOS imager.

14. An apparatus, as defined in claim 3, the patterns being selected from a group including speckle, diffraction, and surface image.

15. A method comprising:
    applying an electromagnetic source towards a surface;
    forming a pattern corresponding to a reflection of the surface by applying a an M×N array of collection elements, where M>1 and N≧1;
    detecting a series of patterns using a sensor array; and
    analyzing the patterns to determine relative motion;
    wherein the M×N array is an array of lenses positioned to form an image of a plane in space that is different from the surface onto the sensor array.

16. The method, as defined in claim 15, wherein:
    the electromagnetic source emits light in the optical wavelength range; and
    wherein the pattern is selected from a group including speckle, diffraction, and surface images.

17. The method, as defined in claim 16, wherein the light source is a coherent light source selected from a group consisting of laser diodes and vertical cavity surface emitting lasers.

18. The method, as defined in claim 16, wherein the light source is one of a non-coherent and a quasi-coherent light source, the light source selected from a group consisting of light emitting diodes (LED) and broadband light source.

19. The method, as defined in claim 15, wherein:
    the sensor array is one of a CCD and a CMOS image array.

20. An apparatus comprising:
    a housing;
    a motion detection circuit, having a sensor array to receive electromagnetic waves, the motion detection circuit to determine a relative motion in a direction along at least one axes; and
    an M×N array of elements interposed between the motion detection circuit and a light source, where M>1 and N≧1 the M×N array of elements to collect the electromagnetic waves from a surface, wherein each element of the M×N array corresponds to a group of sensors in the sensor array.

21. An apparatus, as defined in claim 20, wherein the M×N array is positioned to form a pattern of the surface onto the sensor array.

22. An apparatus, as defined in claim 20, wherein the M×N array of elements comprises an array of lenses, each lens having a reduced focal length, and the array of lenses having an f-number approximately equivalent to a single lens element.

23. An apparatus, as defined in claim 20, wherein the M×N array of elements is integrated to the sensor array at a wafer level.

* * * * *